United States Patent [19]

Baudouin et al.

[11] 4,081,286
[45] Mar. 28, 1978

[54] PROCESS FOR OBTAINING MINERAL CHARGES AND THEIR APPLICATION

[75] Inventors: Jacques Baudouin, Montelimar; Jean-Pierre Caspar, Le Teil, both of France

[73] Assignee: Lafarge S.A., Paris, France

[21] Appl. No.: 724,168

[22] Filed: Sep. 17, 1976

[30] Foreign Application Priority Data

Sep. 18, 1975 France .................................. 7528660

[51] Int. Cl.² .......................... C09C 1/02; C09C 1/28; C09C 1/40
[52] U.S. Cl. .................................................. 106/306
[58] Field of Search ...................... 89/90, 97, 102, 306

[56] References Cited

U.S. PATENT DOCUMENTS 2,248,032  7/1941  Dunn et al. ............................ 106/97
2,786,758  3/1957  Taylor .................................. 106/306
2,935,438  5/1960  Craig ................................... 106/306
3,565,648  2/1971  Mori et al. ............................ 106/89

Primary Examiner—J. Poer
Attorney, Agent, or Firm—Ernest F. Marmorek

[57] ABSTRACT

A hydrated mineral charge is manufactured by grinding a composition selected from the group consisting of calcium aluminates, aluminous cements, and Portland cements, to a powder having an average fineness of from about 3,000 to about 5,000 square centimeters per gram (Blaine's specific surface), hydrating the composition with water to form a paste at a temperature from about 10° C to about 100° C, and adding a sufficient quantity of a liquefying surface active agent to the paste so that its viscosity is less than about 5,000 cps, and so that the paste has a solid content from about 60 percent to about 80 percent by weight.

12 Claims, No Drawings

PROCESS FOR OBTAINING MINERAL CHARGES AND THEIR APPLICATION

CROSS REFERENCE TO RELATED APPLICATIONS.

Reference is had to the applicants' co-pending patent Applications Ser. No. 520,103, filed Nov. 1, 1974, now U.S. Pat. No. 3,998,651; Ser. No. 522,902, filed Nov. 11, 1974 now U.S. Pat. No. 3,992,220; Ser. No. 520,102, filed Nov. 1, 1974 now U.S. Pat. No 3,992,217; and Ser. No. 520,101, filed Nov. 1, 1974.

The invention relates to the continuous production with high yields of hydrates of the following: calcium aluminate, aluminous cement and Portland cements. In particular, the instant invention relates to a process for the preparation of simple and complex hydrates in the form of finely divided powders. It is an important feature of the instant invention that these hydrates can be produced from simple or complex salts such as anhydrous salts, obtained in industries dealing with cement binders and/or binders for refractory materials and/or binders used in the plastering field.

BACKGROUND OF THE INVENTION

It is known that cements or silicates or aluminous hydraulic binders which are to be hydrated in compact forms are utilized because of their binding properties and because of their high strength. These properties are used by manufacturers of concrete and form products which possess properties of compactness, hardness, resistance to compression, and good binding qualities.

Studies have been carried out to determine how the cement becomes hydrated. During use, the grains of the cement become hydrated rapidly after a latent period of induction, the so-called setting period and, thereafter, the hydration proceeds progressively slower. The hydration obtained in this way proceeds with the formation of gels or finely intergrown crystals which solidify the medium by reducing the possible ionic movements. This restricts the chemical reactions so that the hydration of aluminous binders primarily includes hemi-and mono-calcium aluminates after six months or even one year. In the case of Portland cements, the hydration reactions can last tens of years.

It is known that hydrates of finely divided hydraulic binders are prepared in the laboratory in the presence of an excess of water with or without agitation and grinding. Typical examples of laboratory preparation can be found at pages 3682 to 3690 of "Journal of the Chemical Society", 1950 (H.S.W. Taylor) and at page 180 of "The Chemistry of Cement and Concrete" 3rd. Edition, F.M. Lea.

According to these processes, grains of anhydrous material are dispersed in water and may or may not be agitated. This material dissolves slowly and, through the chemical reaction, precipitates hydrates slowly. Thus, in the cited work of F.M. Lea at pages 180 and 181, it is reported that a complete hydration of tricalcium silicate can be obtained in a ball-mill, in the presence of water, within one or two days. Dicalcium silicate, an important constituent of Portland cement, is reported to take about 46 days to hydrate under those conditions.

Known ways of accelerating the process are generally of the type useful only in a laboratory and include physical means such as the use of elevated temperatures or known chemical means such as the use of accelerators, but these approaches are discontinuous and the hydrates obtained usually contain anhydrous material.

The applicants have carried out numerous tests and research projects and have realized that the hydrates are a combination of several ions arising from the anhydrides and water drawn from the reactive medium. The hydrates formed in the course of the hydration of the hydraulic binders are preferably formed at the surface of the least soluble grains of the anhydrides, that is, in the vicinity of which the solubility-product of the compound to be formed is attained rapidly. This indicates that the surfaces of the least reactive anhydrous particles are less and less in contact with the water and that, due to this fact, the kinetics of the reaction of hydration is self-diminishing and ultimately terminates our local reaction. In this connection, the applicants have observed that the particles become surrounded by a hydrated layer and the further reaction is governed by the ionic diffusion across this hydrate layer. This dissolution is governed by the well-known laws of Fick and, in the course of time, becomes negligible.

Known material which are used as mineral charges include kaolins, pyrogenic kaolins, natural and synthetic calcium silicates such as wollastonite, natural and synthetic calcium carbonates, talc, silica, dolomite, barium sulphate. Some of these materials are obtained in micronic form through washing and granulometric selection, such/as kaolin. Other materials are obtained through precipitation in solution, starting from ions obtained by dissolving highly soluble salts such as sodium silicates and sodium aluminates, lime, and aluminum sulphates. In addition, other materials are obtained through the grinding of natural rock by the wet or dry method to obtain the desired degree of fineness. This is the most common case and can be used to obtain micronic powders of carbonates, talcs, dolomites, and silicas to be used as charges or in charges. A fineness in the order of a micron is very expensive and very difficult to carry out through grinding operations.

In the co-pending patent application Ser. No. 520,101, there is disclosed a process for the manufacture of mineral charges of hydrates of calcium aluminate, aluminous cements, and Portland cements. The process starts with synthetic calcium aluminates as used in the manufacture of hydraulic binders or starting with anhydrous calcium silicates. The process of this co-pending patent application includes grinding up the material to an average degree of fineness in the order of one or several tens of microns and hydrating with a sufficient quantity of water to form a paste including hydrated simple and complex calcium aluminates alone or in mixture thereof with hydrated calcium silicate and subjecting at least the large particles to vigorous agitation during the hydration of the paste.

Hydrated particles in the order of a micron are obtained because the vigorous agitation breaks free the hydrated shell which forms around particles and therefore exposes surfaces for the reaction to form the hydration.

Although this process shows a considerable savings in the consumption of energy and reduces the time needed for hydration, there are many cases in which the requirement for vigorous agitation can create problems.

The instant invention makes it possible to obtain hydrated products of at least equal quality while avoiding some of the problems pointed out above.

SUMMARY OF THE INVENTION

One of the principle objects of the invention is a process for obtaining a mineral charge and the application thereof.

One process according to the instant invention is for manufacturing a hydrated mineral charge from a composition selected from the group consisting of calcium aluminates, aluminous cements and Portland cements, includes the steps of grinding the composition to a powder having an average fineness of from about 3,000 to 5,000 square centimeters per gram (Blaine's specific surface), thereafter, hydrating the composition with water to form a paste at a temperature of from about 10° C to about 100° C, and adding a sufficient quantity of a liquifying surface active agent to the paste so that its viscosity after the substantial completion of the hydrating is less than about 5,000 cps, the dry extract of the paste being in a range of from about 60 percent to about 80 percent by weight.

Further objects and advantages of the invention will be set forth in part in the following specification and in part will be obvious therefrom without being specifically referred to, the same being realized and attained as pointed out in the claims hereof. The invention accordingly comprises the several steps and the relation of one or more of such steps with respect to each of the others, all as exemplified in the following detailed disclosure, and the scope of the application of which will be indicated in the claims.

DESCRIPTION OF THE PREFERRED EMBODIMENT

One embodiment of the invention is related to co-pending patent application Ser. No. 520,101. The same materials are used, namely calcium aluminates, aluminous cements, of Portland cements and anhydrous or hydrated lime is added to obtain the desired stoichiometry of the product desired. The lime can also be formed in the nascent state by using hydraulic calcium silicate present in Portland cement. In the presence of water, this becomes hydrolyzed while furnishing lime and hydrated calcium silicates such as tobermorites or xonotlite.

Thus, the products prepared according to the instant invention contain hydrated calcium silicates in addition to hydrated calcium carbo- or sulpho-aluminates. The charge resulting from the process can be varied by adding material such as natural or synthetic calcium sulphate and natural alkaline larch carbonate or those obtained through precipitation. The materials are ground to an average degree of fineness and mixed with water at a temperature of from about 10° C to about 100° C in order to obtain a stable hydrated paste having a dry extract of from about 50% to about 100% by weight and, after the substantial completion of the hydration, water is added to the paste along with a liquefying surface-active agent to obtain a suspension having a viscosity of less than 5,000 csp with a concentration of dry extract from between about 60% to about 80% by weight. It is believed that the excellent results obtained by the instant process can be attributed to the phenomena of rapid growth of the crystals of the hydrate within a very concentrated aqueous medium and the growth of these crystals is limited to micronic dimensions due to the limited environment as the result of the high concentration.

The liquefying surface-active agents can be selected from alkaline (i,e., alkali metal) polyacrylates, starchy materials, cellulose derivatives such as methylcelluloses and carboxymethylcelluloses, phosphates such as polyphosphates, tripolyphosphates, and hexametaphosphates, citric acid, and citrates.

Preferably, the surface-active agent has a concentration of from about 0.2% to about 3% by weight of the dry extract of the paste.

Preferably, the hydration step is carried out without the presence of the surface-active agent.

The suspension obtained by the instant process has many different applications such as in connection with paints and papers.

Also, the suspension is placed in a friction-type grinder of the type with a fluidized bed with microballs in order to assure a perfect deflocution of the mineral charge.

The suspension can also be subjected to a drying process in order to obtain the dry charge.

The following are examples of the instant invention and are not intended to be limitations:

EXAMPLE 1

The following are the steps for manufacturing

calcium aluminates such as aluminous refractory cement can be used and typically has the following chemical composition:

| | |
|---|---|
| SiO | 0.1 parts by weight |
| total of $Al_2O_3$ | 72.3 parts by weight |
| CaO | 26.7 parts by weight |
| $Fe_2O_3$ | 0.03 parts by weight |
| $CO_2$ | 0.25 parts by weight |
| $Na_2O + K_2O$ | 0.27 parts by weight |

The alumina and lime are combined in the form of anhydrous

The calcium needed for the stoichiometry of the reaction can be industrial quicklime of the type available commercially and is determined by the following equation:

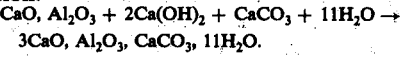

The source for the carbonate can be very pure industrial calcium carbonate of the type available commercially and having a degree of fineness of from about 4,000 to about 5,000 square centimers per gram (Blaine's specific surface).

In order to carry out the reaction, the cement is ground to a degree of fineness of about 4,000 square centimeters per gram (Blaine's specific surface) in a ratio of 415 parts by weight with 364 parts by weight of industrial lime, CaO, and 221 parts by weight of calcium carbonate. This results in a total of 1,000 parts by weight of the so-called anhydrous mixture and reacts with water to form 1,420 parts by weight of the hydrate.

A paste of the anhydrous mixture is made with water with the dry extract being about 50% by weight. An ultra-rapid dispersing-type mixture is used to have the mixing take place continuously.

The paste is recovered at the outlet portion of the paste making device on a running belt.

During the chemical reaction, the hydration process occurs very quickly during the first few minutes and produces a considerable quantity of liberated heat which can elevate the temperature to about 100° C depending upon the thickness of the paste on the conveying belt. The product arrives at the end of the conveying belt where it is cut into pieces and stored in a storage unit.

Later, the hydration reaction is slowed down and an X-ray radiocrystallographic analysis shows that the hydration reaction is substantially completed after 48 hours.

After this, the hydrated paste is combined with a surface-active agent such as the commercially available polyacrylics and crushed to transform the paste into a suspension having a viscosity of less than 1,000 centipoise.

This suspension possesses a dry extract in the order of magnitude or higher than about 70% by weight expressed in terms of the dry hydrates. Next, the suspension is processed according to Example 1 of the aforementioned Application Ser. No. 520,101 in order to pass it across a fluidized bed of microballs.

The product obtained by this product is in the form of a suspension of a white powder, highly concentrated and stable in the presence of 0.8% by weight of a surface-active agent such as the sodium polyacrylate type. The viscosity is about 500 centipoises. The suspension can be used as it is or it can be dried by traditional processes and used.

Typically, if the aqueous suspension is dried through atomization at a low temperature, the powder exhibits the following characteristics:

| | |
|---|---|
| - Appearance: | White micronic powder. |
| - Constitution: | Principally the hydrate $3CaO, Al_2O_3, CaCO_3\ 11\ H_2O$. |
| - Morphology: | Hexagonal micronic plates. |
| - Degree of Fineness: | 44% passing at 2 microns; 96% passing at 8 microns. |
| - Whiteness(photovolt): | $\beta$ equals 93.5%. |
| - pH of 10% aqueous solutions: | 11.5. |
| - Loss on Firing at 1,000° C: | 38.5% |
| - Refraction Index: | 1.54. |
| - Specific Gravity: | $\lambda = 2.18$ grams per cubic centimeter. |
| - Specific Surface (B.E.T.): | 5.6 square meters per gram. |

EXAMPLE 2

The following mixture can be prepared by the standard powder homogenization processes:

Aluminous cement, the composition being the following

| | |
|---|---|
| $SiO_2$ | 0.1 parts by weight |
| $Al_2O_3$ | 72.34 parts by weight |
| CaO | 26.7 parts by weight |
| $Fe_2O_3$ | 0.03 parts by weight |
| $CO_2$ | 0.25 parts by weight |
| $Na_2O + K_2O$ | 0.27 parts by weight. |

The alumina and lime are in the form of anhydrides, namely $CaO, Al_2O_3$ and $CaO, 2Al_2O_3$.

Calcium sulphate (natural gypsum from a quarry) of the following composition:

| | |
|---|---|
| CaO | 35.5 parts by weight |
| $SO_3$ | 39.5 parts by weight |
| $CO_2$ | 6 parts by weight |
| $H_2O$ | 18 parts by weight | and present in the form of a fine powder having a fineness of about 4,000 square centimeters per gram (Blaine's specific surface). The calcium sulphate was about 87.7 parts by weight.

| | |
|---|---|
| - Hydrated commercially: available lime: | about 78.2 parts by weight |

The well homogenized mixture was continuously transmitted to a granulation-plate at about the same rate the water necessary to form the granules was supplied in the proportion appropriate for the stoichiometry of the reactions:

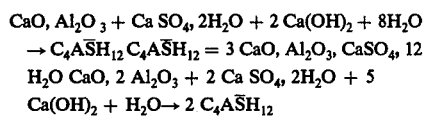

There is obtained 50 parts by weight of the powder mixture and 50 parts by weight of water.

The hydration reaction is rapid and a Roentgenographic analysis shows the granules comprise mostly hydrated calcium monosulfoaluminate after about 6 hours of storage.

Subsequently, these granules are placed into a dispersing-grinding-crushing device in accordance with the conditions analagous to those given herein in Example 1.

The product is dried according to standard methods and has the appearance of an impalpable powder having the following principal characteristics:

| | |
|---|---|
| - Appearance: | White, micronic powder. |
| - Construction: | Principally $3\ CaO, Al_2O_3, Ca\ SO_4, 12\ H_2O$. |
| - Morphology: | Hexagonal micronic plates. |
| - Degree of fineness (Laser): | 32% passing at 2 microns 72% passing at 4 microns 95% passing at 8 microns. |
| - Whiteness(photovolt): | $\beta$ - 94.0% |
| - pH of 10% aqueous solution: | 11.6. |
| - Loss on Firing at 1,000° C: | 36.2%. |
| - Specific gravity: | $\lambda = 2.07$ grams per cubic centimeter. |
| - Specific surface (B.E.T.): | 7 square meters per gram. |

EXAMPLE 3

In order to produce a hydrate having the following chemical formula: $3\ Ca\ O, Al_2O_3, 6\ H_2O$, the following materials are used. One or more calcium aluminates such as: $Ca\ O, 2\ Al_2O_3$; $Ca\ O, Al_2O_3$; $12\ Ca\ O, 7\ Al_2O_3$; and $3Ca\ O, Al_2O_3$, as a source for the alumina along with quick-lime or hydrated lime or a substance capable of liberating lime if needed for the reaction. In addition, of course, water is needed.

Typically, an aluminous refractory cement having the following composition has been used as the source for the calcium aluminate:

| | | |
|---|---|---|
| | $SiO_2$ | 0.1 parts by weight |
| | $Al_2O_3$ | 72.3 parts by weight |
| | CaO | 26.7 parts by weight |
| | $Fe_2O_3$ | 0.03 parts by weight |
| | $CO_2$ | 0.25 parts by weight |
| | $Na_2O + K_2O$ | 0.27 parts by weight. |

The alumina and lime are in the form of anhydrides, namely

CaO, $Al_2O_3$ and CaO, 2 $Al_2O_3$

A mixture of the industrial cement is ground to a fineness of about 3,000 square centimeters per gram (Blaine's specific surface) and about 450 parts by weight is combined with about 550 parts by weight of industrial calcium hydroxide of the type available commercially. The powder mixture obtained is then well homogenized according to standard processes used in the treatment of pulverized materials and converted into a paste following the herein Example 1.

The product, when it is dry, shows up as a fine powder possessing the following characteristics:

| | |
|---|---|
| - Composition: | Hexahydrated tricalcic aluminate 3 CaO, $Al_2O_3$, 6 $H_2O$. |
| - Appearance: | White, micronic powder. |
| - Morphology: | Cubic micro-crystals. |
| - Granulometry: average particle diameter: | 1.6 microns. |
| - Whiteness (photovolt): | 94.4% for 495 mµ. |
| - Loss on Firing at 1,000° C: | 24.6%. |
| - Specific Gravity of the charge: | λ = 2.49 grams per cubic centimeter. |
| - Refraction Index: | 1.60. |
| - Specific surface (B.E.T. method): | 10.9 square centimeters per gram. |

It should be noted that these characteristics correspond to those of a very good white mineral charge.

EXAMPLE 4

The following example starts with the pre-hydration of a white Portland cement as described in the Example 4 of the aforementioned Application Ser. No. 520,101.

The white Portland cement has the following composition:

| | |
|---|---|
| $SiO_2$ | 23.7% |
| $Al_2O_3$ | 2.7% |
| $Fe_2O_3$ | 0.3% |
| CaO | 69.3% |
| $SO_3$ | 1.2% |
| Other: | 2.82%. |

This Portland cement is hydrated by the addition of about 186 parts of water to about 100 parts of the cement. The hydration process is accelerated by an attrition-type grinding process and this is continued so that the hydration process is substantially completed after about 6 hours.

By starting with about 100 parts of the cement, there is obtained about 130.5 parts of the hydrate distributed between about 57% tobermorite and about 43% of lime.

If, instead, pure calcium carbonate of the type available commercially is combined with aluminous refractory cement containing about 69.2% of $Al_2O_3$ and about 29.8% of CaO, a different product is obtained. This mixture is prepared in such proportion to obtain the following overall proportions:

| | |
|---|---|
| - Anhydrous white Portland cement: | 47.9 parts by weight. |
| - Calcium carbonate: | 17.9 parts by weight. |
| - Aluminous cement: | 34.2 parts by weight. |

The process of preparing a paste of the three components of the mixture is carried out with the help of an ultra-rapid dispersing mixture with the addition of water, necessary to obtain a total anhydrous dry extract of approximately 55% by weight.

The chemical reaction is of the type described in the Example 1b, herein. The X-Ray analysis shows the presence of hydrated calcium silicates of the tobermorites type, in addition to the hydrated monocarboaluminate The action is substantially completed after about 48 hours of hydration.

The hydrated base is transformed into a suspension having a viscosity of less than about 1,000 centipoises with the addition of a surface-active agent such as a polyacrylate as the type available commercially or such as a carboxymethyl cellulose. The amount of the agent is between about 0.5 to about 1.2% by weight.

The suspension contains a large quantity of the dry extract and is in the order of at least 70% by weight. The suspension is further processed in a grinding device and stored as such, or in dry form.

The powder obtained through the process possesses the following characteristics:

| | |
|---|---|
| - Appearance: | White, micronic powder. |
| - Constitution: | Hydrate 3 CaO, $Al_2O_3$, $CaCO_3$, 11 $H_2O$ and hydrates of the tobermorite type. |
| - Morphology: | Mixture of hexagonal micronic plates and of some rod-like particles. |
| - Degree of fineness: | 49% passing at 2 microns; 97% passing at 8 microns. |
| - Whiteness (photovolt): | β = 93.8. |
| - pH of 10% aqueous solution: | 11.5. |
| - Loss through firing at 1,000° C: | 39.5%. |
| - Refraction Index: | 1.54. |
| - Specific Gravity: | λ = 2.10 grams per square centimeter. |
| - Specific surface (B.E.T.): | 6.5 square meters per gram. |

The following are examples using the compositions manufactured according to the instant invention.

In connection with the paper making industry, the following coating preparations have been prepared from the suspensions produced by the above examples. In Table I, formulation A is the prior art and the formulations B, C, and D are obtained with the instant invention.

TABLE I

| Formulations | A | B | C | D |
|---|---|---|---|---|
| Kaolin | 80 | — | — | 20 |
| Carbonate | 20 | 20 | — | — |
| Example 1 - suspension | — | 80 | — | — |
| Example 2 - suspension | — | — | 100 | — |
| Example 3 - suspension | — | — | — | 80 |
| Dispersant | 0.2 | 0.2 | 0.3 | 0.2 |
| Dry Starch | 8 | 7 | 7.8 | 6.2 |

TABLE I-continued

| Formulations | A | B | C | D |
|---|---|---|---|---|
| Dry Vinyl Emulsion | 8 | 7.6 | 7.8 | 6.2 |
| Water | 77.5 | 70.4 | 77.3 | 72 |
| E.S. Dry Extract | 60% | 62% | 60% | 61% |

The paper coating made from the formations A, B, C, and D have the following characteristics as given in Table II:

TABLE II

| Formulation | A | B | C | D |
|---|---|---|---|---|
| Brookfield viscosity (in cps) at 100 RPM | 1300 | 1200 | 1460 | 300 |
| pH | 8.5 | 11.5 | 11.6 | 10.5 |
| Water retention in seconds | 36 | 29 | 38 | 21 |

Applied on AFNOR VII Standard Paper, the formulations A, B, C and D give the results shown on Table III.

TABLE III

| | A | B | C | D |
|---|---|---|---|---|
| Coating weight g/m²/side | 12 | 12 | 12 | 12 |
| Whiteness (photovolt) % | 83.5 | 85.2 | 85.1 | 85.0 |
| Opacity % | 90 | 88.5 | 91.1 | 90.2 |
| Coating porosity | closed | micro-porous | micro-porous | very slightly micro-porous |
| Coating shining % | 60 | 59 | 57 | 20 |
| Red standard ink shining | 72 | 68.5 | 70 | 60 |

Thus, the formulations B and C prepared with the charge of the instant invention have properties equal to or superior to the control formulation A.

The formulation D allows one to obtain papers with a matte coating and it can be mixed with the formulations B and C in order to diminish the brilliancy of the coating.

We wish it to be understood that we do not desire to be limited to the exact details of construction shown and described, for obvious modifications will occur to one skilled in the art. Having thus described the invention, what we claim as new and desire to be secured by Letters Patent, is as follows:

We claim:

1. In a process for manufacturing a hydrated mineral charge from a composition selected from the group consisting of calcium aluminates, aluminous cements, and Portland cements,
    the steps comprising:
    grinding said composition to a powder having an average fineness of from about 3,000 to about 5,000 square centimeters per gram (Blaine's specific surface);
    hydrating said composition with water to form a paste at a temperature from about 10° C to about 100° C; and
    adding a sufficient quantity of a liquefying surface active agent to said paste so that its viscosity after the substantial completion of said hydrating is less than about 5,000 cps;
    said paste having a solids content from about 60% to about 80% by weight.

2. The process as claimed in claim 1, further comprising adding to said composition from which said hydrated mineral charge is manufactured at least one member of the group consisting of natural and synthetic calcium sulphate, natural alkaline earth carbonates, and carbonates obtained through precipitation.

3. The process as claimed in claim 1, wherein said composition from which said hydrated mineral charge is manufactured is calcium aluminate and further comprises adding lime or a source of lime to said calcium aluminate.

4. The process as claimed in claim 3, wherein said source of lime is a hydraulic calcium silicate or a Portland cement.

5. The process as claimed in claim 3, wherein a quantity of lime is substantially the amount needed in order to satisfy the stoichiometric relationship for said hydrated mineral charge.

6. The process as claimed in claim 1, wherein said surface-active agent is selected from the group consisting of alkali metal polyacrylates, starch, cellulose compounds phosphates, citric acid and citrates and is added in the amount of from about 0.2 to about 3% by weight of said composition.

7. The process as claimed in claim 6, wherein said starch includes dextrin starches.

8. The process as claimed in claim 6, wherein said cellulose derivatives include methyl cellulose and carboxymethyl cellulose.

9. The process as claimed in claim 6, wherein said phosphates include tripolyphosphates and hexamethaphosphates.

10. The process as claimed in claim 6, wherein said surface active agent is citric acid or a citrate.

11. The process as claimed in claim 1, further comprising removing heat formed during the hydration in order to maintain the temperature of said paste below about 100° C.

12. The process as claimed in claim 1, further comprising drying said paste.

* * * * *